(12) United States Patent
Gilmour et al.

(10) Patent No.: US 9,129,141 B2
(45) Date of Patent: Sep. 8, 2015

(54) METHOD FOR MODELING A REPAIR IN AN ELECTRIC GRID

(75) Inventors: Stuart Gilmour, Airdrie (GB); Steven Sparling, Kirkcaldy (GB)

(73) Assignee: General Electric Company, Schenectady, NY (US)

(*) Notice: Subject to any disclaimer, the term of this patent is extended or adjusted under 35 U.S.C. 154(b) by 847 days.

(21) Appl. No.: 13/344,379

(22) Filed: Jan. 5, 2012

(65) Prior Publication Data

US 2013/0179143 A1    Jul. 11, 2013

(51) Int. Cl.

| | | |
|---|---|---|
| *G06F 17/50* | (2006.01) | |
| *G06G 7/54* | (2006.01) | |
| *G06G 7/63* | (2006.01) | |
| *G06Q 10/00* | (2012.01) | |
| *H02J 3/00* | (2006.01) | |
| *H02J 13/00* | (2006.01) | |

(52) U.S. Cl.
CPC .................. *G06G 7/63* (2013.01); *G06Q 10/00* (2013.01); *H02J 3/006* (2013.01); *H02J 13/001* (2013.01); *H02J 2003/007* (2013.01); *Y02B 70/3216* (2013.01); *Y02E 60/76* (2013.01); *Y04S 10/40* (2013.01); *Y04S 10/525* (2013.01); *Y04S 20/221* (2013.01); *Y04S 40/22* (2013.01)

(58) Field of Classification Search
CPC ......... G06G 7/63; G06Q 10/00; H02J 13/001; H02J 3/006; H02J 2003/007; Y02B 70/3216; Y02E 60/76; Y04S 10/40; Y04S 10/525; Y04S 20/221; Y04S 40/22

USPC .................................................. 703/1, 17, 18
See application file for complete search history.

(56) References Cited

U.S. PATENT DOCUMENTS

| | | |
|---|---|---|
| 6,618,811 B1 | 9/2003 | Berthaud et al. |
| 6,681,154 B2 | 1/2004 | Nierlich et al. |
| 7,085,660 B2 | 8/2006 | Mansingh et al. |
| 7,288,921 B2 | 10/2007 | Huff et al. |
| 7,333,861 B2 | 2/2008 | Rosenof et al. |
| 7,454,270 B2 | 11/2008 | Mansingh et al. |
| 7,474,080 B2 | 1/2009 | Huff et al. |
| 7,489,989 B2 | 2/2009 | Sukhanov et al. |
| 7,689,323 B2 | 3/2010 | Mansingh et al. |
| 7,715,951 B2 | 5/2010 | Forbes, Jr. et al. |
| 7,961,740 B2 | 6/2011 | Flammer, III et al. |
| 2004/0008018 A1* | 1/2004 | Miller et al. ............. 324/67 |
| 2010/0217550 A1 | 8/2010 | Crabtree et al. |
| 2011/0013323 A1* | 1/2011 | Hyde et al. ............. 361/54 |
| 2011/0176416 A1 | 7/2011 | Bhatti et al. |
| 2011/0196546 A1 | 8/2011 | Muller et al. |
| 2013/0035887 A1* | 2/2013 | Fan ......................... 702/72 |

* cited by examiner

*Primary Examiner* — Kamini S Shah
*Assistant Examiner* — Andre Pierre Louis
(74) *Attorney, Agent, or Firm* — Armstrong Teasdale LLP

(57) ABSTRACT

This disclosure describes methods for use with energy management systems that electric utilities use to manage power distribution networks. The methods can account for changes in phase value that dynamic cross-phasing causes in the power distribution network. In one embodiment, the methods facilitate computer-based modeling of the power distribution network to include such changes in phase value into a connectivity model, which provides a schematic representation of the power distribution network.

17 Claims, 3 Drawing Sheets

METHOD FOR MODELING A REPAIR IN AN ELECTRIC GRID

BACKGROUND OF THE INVENTION

The subject matter of this disclosure relates to electrical power distribution and, more particularly, to methods for modeling dynamic cross-phasing in computer-based models of a power distribution network.

Electric utilities deliver power to consumers via a power distribution network (also "an electric grid"). The electric grid includes a centrally-located power generator, e.g., a coal-fired power plant or a hydro-electric turbine, that generates electrical power. The electric grid distributes the electrical power across a network of transmission lines of varying size and capacity. For three-phase alternating current (AC), which is typical of the power the utilities generate for consumer delivery, the topology of the network includes large cables or "multi-phase branches" with three individual wires for each of the phases of the three-phase AC power. These multi-phase branches form the backbone of the electric grid, often carrying electrical power away from the power generator to remote areas where consumers are found. Smaller cables or "single-phase branches" with only one wire carry one phase of the electrical power to the individual consumers or groups of consumers. Transfer of electrical power from the multi-phase branches to the single-phase branches often occurs at a component (e.g., a transformer) in the electric grid.

The electrical utilities monitor operation of the electric grid with sophisticated energy management systems. These systems use a variety of computer-based programs that generate and maintain models of the electric grid. The electric utilities use these models to monitor operation of the power generator and the components of the network to maintain constant and adequate supply of electrical power. These programs also help the electric utilities respond to problems or "fault conditions" that arise on the network from time-to-time. Fault conditions can often disrupt delivery of power to certain areas of the electric grid.

The electric utilities address fault conditions with a variety of tools that direct power from one branch (the "operational branch") to another branch (the "faulty branch") on which the fault condition disrupts the flow of electrical power. Collectively, use of these tools to divert electrical power from the one branch to another is often referred to as "dynamic cross-phasing." One example of dynamic cross-phasing occurs when the electric utilities actuate switches in place within the network to direct electrical power from the operational branch to the faulty branch. In another example, the electric utilities deploy technicians to install a jumper, which in its simplest form is a cable that couples the operational branch to the faulty branch, thereby resuming delivery of electrical power on the faulty branch.

Dynamic cross-phasing may change the phase value of the faulty branch. For example, in one scenario where the faulty branch has only one wire (e.g., a single-phase branch) and the operational branch has three-wires (e.g., a multi-phase branch), the jumper may couple the wire in the faulty branch to a wire in the operational branch that carries phase with a different phase value. Although this configuration of the jumper solves the immediate problem with distribution, the change in the phase value of the faulty branch to the phase value of the corresponding wire in the operational branch often does not propagate back to the models of the energy management system.

The discussion above is merely provided for general background information and is not intended to be used as an aid in determining the scope of the claimed subject matter.

BRIEF DESCRIPTION OF THE INVENTION

This disclosure describes methods that can account for changes in phase value that dynamic cross-phasing causes in the electric grid, wherein the methods can facilitate computer-based modeling of the electric grid to include such changes in the resulting model. An advantage that the practice of some embodiments of the methods is to provide a model in which the electric utility can determine a current phase value that any branch in the electric grid carries at any given time.

The disclosure describes an embodiment of a method of generating a connectivity model of a power distribution network. The method comprises one or more steps for inserting a power directing element in the connectivity model, the power directing element having a first node coupled to a first branch of the connectivity model and a second node coupled to a second branch of the connectivity model. The method also comprises one or more steps for assigning an actual phase value to the power directing element and to the first node and the second node, the actual phase value for the first node and the second node corresponding to, respectively, the first branch and the second branch. The method further comprises one or more steps for generating the connectivity model with the actual phase values.

The disclosure also describes an embodiment of an energy management system. The energy management system comprises a processor, memory coupled to the processor, and one or more executable instruction stored on the memory and configured to be executed by the processor. The executable instructions including one or more instruction for generating a connectivity model of an electrical grid on a display, the connectivity model comprising a power directing element having a first node coupled to a first branch of the connectivity model and a second node coupled to a second branch of the connectivity model. The executable instructions also include one or more instructions for assigning an actual phase value to the power directing element and to the first node and the second node, the actual phase value for the first node and the second node corresponding to, respectively, the first branch and the second branch.

The disclosure further describes an embodiment of a computer program product for managing power distribution in an electrical grid. The computer program product including a non-transitory computer readable medium storing one or more executable instructions for causing a computer to implement a method. The method comprising one or more steps for inserting a power directing element in the connectivity model, the power directing element having a first node coupled to a first branch of the connectivity model and a second node coupled to a second branch of the connectivity model. The method also comprising one or more steps for assigning an actual phase value to the power directing element and to the first node and the second node, the actual phase value for the first node and the second node corresponding to, respectively, the first branch and the second branch. The executable instructions also comprising one or more steps for generating the connectivity model with the actual phase values.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

Figure 1:
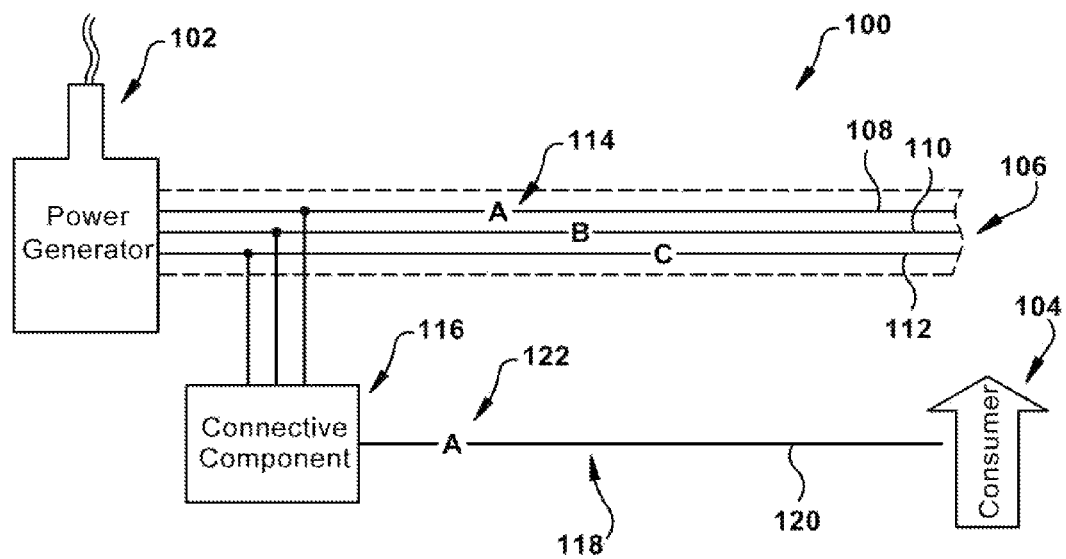
FIG. 1 depicts a schematic diagram of an exemplary power distribution system in a normal state.
Figure 2:
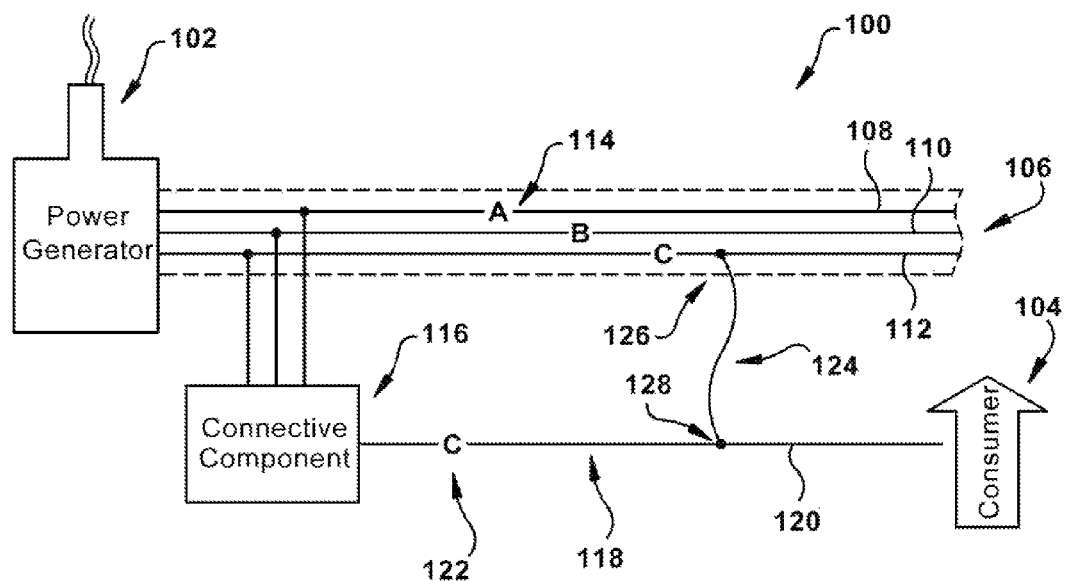
FIG. 2 depicts a schematic diagram of the exemplary power distribution system of FIG. 1 in a repair state.

FIGS. 1 and 2 illustrate a schematic diagram of an exemplary power distribution system 100 (also "electric grid 100") that distributes electrical power. Referring first to FIG. 1, the electric grid 100 includes a power generator 102 that generates alternating current (AC) electrical power for delivery to a consumer 104. A multi-phase branch 106 carries the AC electrical power from the power generator 102. The multi-phase branch 106 has a plurality of conducting wires (e.g., a first wire 108, a second wire 110, and a third wire 112), each with a phase values 114 (also "multi-phase value 114"). In the present example, the multi-phase value 114 of the first wire 108, the second wire 110, and the third wire 112 is, respectively, the A phase, the B phase, and the C phase of the AC electrical power.

The electric grid 100 also includes a connective component 116 (e.g., a transformer) that couples with the multi-phase branch 106 and to a single phase branch 118. The connective component 116 directs electrical power from the multi-phase branch 106 to a single wire 120 of the single phase branch 118. During operation, the single wire 120 will have a phase value 122 (also "single phase value 122") that reflects one of the wires (e.g., the first wire 108, the second wire 110, the third wire 112) in the multi-phase branch 106. In this example, the single phase value 122 of the single wire 120 is the A phase.

In FIG. 2, the electric grid 100 further includes a power directing element 124 (e.g., a switch, a jumper, etc.) that couples the single wire 120 to a wire of the multi-phase branch 106. The power directing element 124 forms a plurality of nodes (e.g., a first node 126 and a second node 128) with the corresponding wires and/or branches to which it is connected. The nodes 126, 128 represent the physical connection between the power directing element 124 and the wires (e.g., the wires of the multi-phase branch 106 and the single phase branch 118). Use of the power directing element 124 changes the single phase value 122 of the single wire 120. This feature maintains operation of the single wire 120 in the electric grid 100. For example, the physical connection at the nodes 126, 128 permits electrical power to conduct through power directing element 124, which effectively re-energizes the single wire 120 after a fault or failure condition occurs. For purpose of the present example, the first node 126 and the second node 128 couple with, respectively, the third wire 112 and the single wire 120. This configuration directs one phase of the AC electrical power from the multi-phase branch 106 to the single-phase branch 118.

The electric grid 100 typically operates in a normal state in which no fault is present. The normal state describes conditions on the electric grid 100 in which the phase value on the wires in the electric grid 100 is the value prescribed, e.g., by design. This prescribed value is also called the "normal phase." Table 1 shows the phase values for various components of the electric grid 100 in the normal state.

TABLE 1

| Component | Normal Phase | Actual Phase | First Node 126 | Second Node 128 |
|---|---|---|---|---|
| 112 | C | C | C | C |
| 120 | A | A | A | A |
| 124 | — | — | C | A |

As shown in Table 1, the phase values coincide with the multi-phase value 114 and the single phase value 122. These phase values would occur during normal operation and would otherwise be expected by the electric utility that is responsible for monitoring the performance of the electric grid 100.

Damage to one of the branches and/or wires can cause the electric grid 100 to enter into a repair state, e.g., where the single wire 120 is damaged. In the repair state, the power directing element 124 maintains the flow of electrical power in the single wire 120. Operation and implementation of the power directing element 124 in this manner changes the phase value on one or more components of the electric grid 100 from the normal value. This change would be reflected in the "actual value" of Table 1 above and, more particularly, in Table 2 below, which shows the phase values for various components of the electric grid 100 in the repair state.

TABLE 2

| Component | Normal Phase | Actual Phase | First Node 126 | Second Node 128 |
|---|---|---|---|---|
| 112 | C | C | C | C |
| 120 | A | C | A | A |
| 124 | C | C | C | A |

As shown by Tables 1 and 2, changes in condition of the electric grid 100 from the normal state to the repair state changes the single phase value 122 of the single wire 120 from the A phase (see, e.g., the actual value in Table 1) to the C phase (see, e.g., the actual value in Table 2). However, in other examples the first node 126 could couple with any of the other wires (e.g., the first wire 108 and the second wire 110), as desired, thereby resulting in the actual value of the single phase value 122 corresponding to the multi-phase value 114 of any one of the wires of the multi-phase branch 106.

Figure 3:
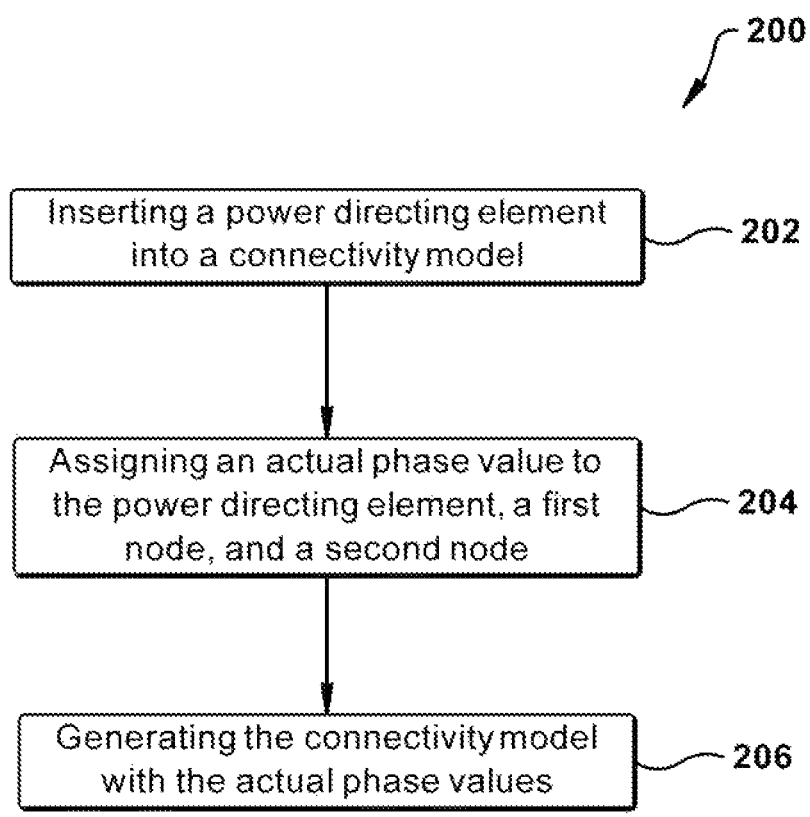
FIG. 3 depicts a flow diagram of an exemplary method for generating a connectivity model of a power distribution system such as the power distribution system of FIGS. 1 and 2.

FIG. 3 is a flow diagram of an exemplary method 200 to generate a connectivity model of an electric grid (e.g., the electric grid 100 of FIGS. 1 and 2) in the repair state. The connectivity model is a schematic diagram that displays the wiring and components of the electric grid. Energy management systems can render the schematic diagram to display a concise, accurate layout of the electric grid. This representation facilitates management tasks by the electric utility and its engineers, technicians, and other individuals. Examples of the energy management system may operate as supervisory control and data acquisition (SCADA) systems, commercially available from a variety of sources.

The method 200 includes, at step 202, inserting a power directing element connecting a first branch and a second branch of a connectivity model. The method 200 also includes, at step 204, assigning an actual phase value to the power directing element and to a first node and a second node of the power directing element. The method 200 further includes, at step 206, generating the connectivity model with the actual phase values.

Embodiments of the method 200 may embody one or more executable instructions which, when executed by a processor, provide certain features and functions as part of the energy management system. These executable instructions can be part of a computer program product that resides in whole, or in part, on memory coupled to the processor and/or otherwise accessible to some processing device, e.g., via cloud computing devices. The method 200 (and/or the executable instruction and/or the computer program product) can be implemented as part of an energy management system that may further provide a display and/or interface that permits an end user to input information to display, generate, update, and/or manipulate the connectivity model. These inputs may include drawing inputs to represent the various components and wires found in the electric grid including the power directing element. Moreover, whereas the connectivity model of the electric grid in its normal state may exist prior to the repair state, the method 200 can also permit the existing connectivity model to be updated with new, additional information that reflects the repair state.

The step for inserting the power directing element (e.g., at step 202) includes placement of one or more power directing elements into the schematic diagram. For existing connectivity models, the end user can locate the position of the electric grid that the fault condition impacts. This may include scrolling about the schematic diagram or, in one example, inputting one or more coordinates (e.g., latitude and longitude) where the problem resides in the electric grid. Once in the correct position, the end user can include the power directing element in the connectivity model. This feature may require the end user to select from a listing of exemplary devices (e.g., a jumper, a switch, etc.) that correspond to the physical device the electric utility implements to fix the problem.

The first node and the second node can provide a representation of the coupling and/or electrical connection, e.g., between a jumper and the wire(s) of the branches. The first node and the second node act as a reference to indicate the presence of the power directing element in the connectivity model. Thus, operations and techniques to render and display the connectivity model will detect the first nodes and the second node and, in one example, recognize the position of the power directing element in the connectivity model.

The step for assigning an actual phasing value (e.g., at step 204) associates the first node and the second node with the branch to which the respective node is connected. This step can occur manually through input of pertinent information by the end user, although the present disclosure also contemplates features for automatic recognition of the actual phase value. In one example, the actual phase value of the first node and/or the second node corresponds to the normal phase value of the operational branch and, more particularly, the normal phase value of the wire that is still conducting electrical power.

The step for generating the connectivity model with the actual phase values (e.g., at block 206) uses the phase value assigned to the nodes. For example, execution of the method 200 will recognize the nodes in the schematic diagram. The method 200 will assign the phase value of the nodes to the corresponding branches of the connectivity model. Thus, for the example of FIG. 2 above, the resulting connectivity model will assign the C-phase to the faulty branch based on the phase value of the node.

Figure 4:
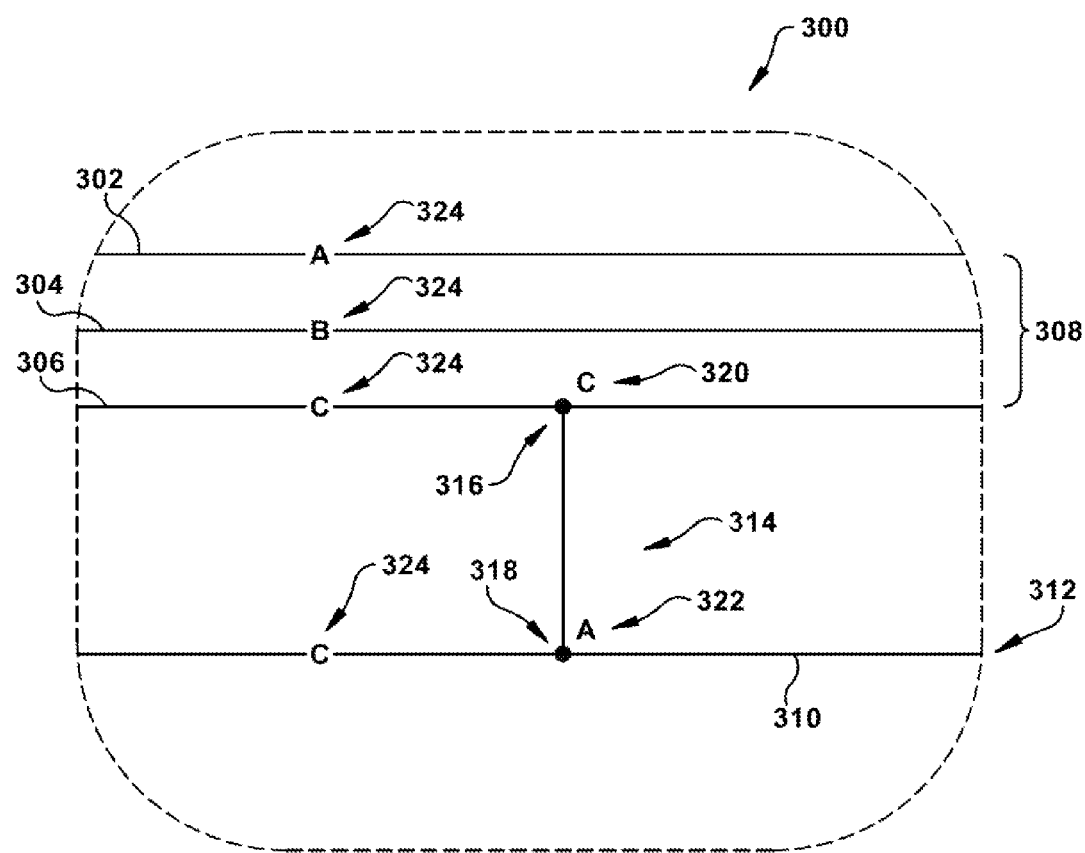
FIG. 4 depicts an exemplary connectivity model that results from execution of the method of FIG. 3.

FIG. 4 depicts an example of a connectivity model 300 that results from execution of the method 200 and its embodiments. The connectivity model 300 can be displayed on a screen or other device, providing a visual representation of the power distribution network (or electrical grid) that is useful for monitoring and understanding operation of the network at any given time. In the present example, the connectivity model 300 provides a wire-diagram of the electric grid 100 discussed in connection with FIGS. 1 and 2 above.

The connectivity model 300 includes representative wires 302, 304, and 306 for each of the wires of a multi-phase branch 308. The connectivity model 300 also includes a representative wire 310 that represents the wire of the single-phase branch 312. Also shown in FIG. 4, the connectivity model 300 has a representative jumper 314 with a first node 316 and a second node 318 that couple to, respectively, the representative wires 306 and 310. A node phase value (e.g., a first node phase value 320 and a second node phase value 322) is assigned to the first node 316 and the second node 318 and an actual phase value 324 is assigned to each of the representative wires 302, 304, 306, and 310.

The connectivity model 300 results from execution and processing of information that relates to the jumper 314. In one embodiment, the end user will input information about the representative jumper 314 and the first node 320 and 322. The energy management system will process this information and, in one example, assign the actual phase values 324 based on the input information.

In view of the foregoing, embodiments of the methods are configured to identify nodes of a power directing element and associate the phase value of the nodes with the phase value of the wires and/or branches to which the power directing element couples. A technical effect is to generate a connectivity model having current phase values that reflect use of the power directing elements in the electric grid.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "service," "circuit," "circuitry," "module," and/or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of mputer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including blocks in the flowchart illustrations and/or block diagrams, can be implemented by co instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of generating a connectivity model of a power distribution network, said method comprising one or more steps for:

inserting, via a processor, a power directing element in the connectivity model, the power directing element having a first node coupled to a first branch of the connectivity model and a second node coupled to a second branch of the connectivity model;

assigning, via the processor, an actual phase value to the power directing element and to the first node and the second node, the actual phase value for the first node and the second node corresponding to, respectively, the first branch and the second branch, wherein assigning the actual phase value is based on information received corresponding to the power directing element and the first node; and generating, via the processor, the connectivity model with the actual phase values.

2. The method of claim 1, further comprising updating the actual phase values in response to a change in state of the power distribution network.

3. The method of claim 1, further comprising changing the location of the power directing element.

4. The method of claim 1, wherein the first branch comprises a plurality of wires, and wherein the wires carry have different phase values.

5. The method of claim 1, wherein the power directing element comprises a jumper.

6. The method of claim 1, wherein the power directing element comprises a switch.

7. The method of claim 1, further comprising applying a tracing technique to determine the actual phase value for an identified branch in the connectivity model.

8. An energy management system, comprising:
a processor;
memory coupled to the processor; and
one or more executable instruction stored on the memory and configured to be executed by the processor, the executable instructions including one or more instruction for:

generating a connectivity model of an electrical grid on a display, the connectivity model comprising a power directing element having a first node coupled to a first branch of the connectivity model and a second node coupled to a second branch of the connectivity model; and assigning an actual phase value to the power directing element and to the first node and the second node, the actual phase value for the first node and the second node corresponding to, respectively, the first branch and the second branch, wherein assigning the actual phase value is based on information received corresponding to the power directing element and the first node.

9. The method of claim 6, further comprising instructions for updating the actual phase values in response to a change in state of the power distribution network.

10. The method of claim 6, further comprising instructions for changing the location the power directing element.

11. The method of claim 6, wherein the power directing element comprises a jumper.

12. The method of claim 6, wherein the power directing element comprises a switch.

13. A computer program product for managing power distribution in an electrical grid, said computer program product including a non-transitory computer readable medium storing one or more executable instructions, the executable instruction causing a computer to implement a method comprising one or more steps for:

inserting a power directing element in the connectivity model, the power directing element having a first node coupled to a first branch of the connectivity model and a second node coupled to a second branch of the connectivity model;

assigning an actual phase value to the power directing element and to the first node and the second node, the actual phase value for the first node and the second node corresponding to, respectively, the first branch and the second branch, wherein assigning the actual phase value is based on information received corresponding to the power directing element and the first node; and generating the connectivity model with the actual phase values.

14. The computer program product of claim 11, further comprising updating the actual phase values in response to a change in state of the power distribution network.

15. The computer program product of claim 11, further comprising changing the location the power directing element.

16. The computer program product of claim 11, further comprising applying a tracing technique to determine the actual phase value for an identified branch in the connectivity model.

17. The computer program product of claim 11, wherein the first branch comprises a plurality of wires, and wherein the wires carry have different phase values.

* * * * *

UNITED STATES PATENT AND TRADEMARK OFFICE
CERTIFICATE OF CORRECTION

| | | |
|---|---|---|
| PATENT NO. | : 9,129,141 B2 | |
| APPLICATION NO. | : 13/344379 | |
| DATED | : September 8, 2015 | |
| INVENTOR(S) | : Gilmour et al. | |

It is certified that error appears in the above-identified patent and that said Letters Patent is hereby corrected as shown below:

In the Specification,

Column 7, lines 47-48, delete "combinations of mputer program instructions." and insert therefor -- combinations of blocks in the flowchart illustrations and/or block diagrams, can be implemented by computer program instructions. --.

Column 7, lines 61-63, delete "including blocks in the flowchart illustrations and/or block diagrams, can be implemented by co instructions which implement" and insert therefor -- including instructions which implement --.

Signed and Sealed this
Twenty-third Day of August, 2016

Michelle K. Lee
*Director of the United States Patent and Trademark Office*